United States Patent [19]

Goodwin

[11] Patent Number: 4,679,908
[45] Date of Patent: Jul. 14, 1987

[54] LASER-FIBER POSITIONING METHOD

[75] Inventor: John C. Goodwin, Nepean, Canada

[73] Assignee: Northern Telecom Limited, Montreal, Canada

[21] Appl. No.: 797,328

[22] Filed: Nov. 12, 1985

[30] Foreign Application Priority Data

Jun. 28, 1985 [CA] Canada .................................. 486031

[51] Int. Cl.⁴ .............................................. G02B 6/42
[52] U.S. Cl. .................................... 350/320; 156/155; 350/96.20
[58] Field of Search ................. 350/96.15, 96.17, 96.18, 350/96.20, 96.21, 320; 250/227, 551; 357/17, 19, 30, 74; 156/60, 64, 155

[56] References Cited

U.S. PATENT DOCUMENTS

| | | | |
|---|---|---|---|
| 4,237,474 | 12/1980 | Ladany | 350/96.20 X |
| 4,296,998 | 10/1981 | Dufft | 350/96.20 |
| 4,469,399 | 9/1984 | Cowen et al. | 350/96.20 |
| 4,523,802 | 6/1985 | Sakaguchi et al. | 350/96.20 X |

OTHER PUBLICATIONS

Bailey et al, "Method and Apparatus to Align and Affix an Optical Fiber . . .", *Xerox Discl. Journ.*, vol. 4, No. 3, May/Jun. 1979, pp. 387–388.

Primary Examiner—John Lee
Attorney, Agent, or Firm—John E. Mowle

[57] ABSTRACT

To position a light output device such as a laser diode relative to a light input device such as a waveguide so as to obtain maximum coupling of light, light is launched into one end of the fiber and is detected at a remote part of the fiber where a corresponding electrical signal is generated. Positional information contained in the signal is used to reduce misalignment between the waveguide and laser by manipulating a positioner attached to the fiber. Since there is usually some slight movement of the fiber as an anchoring epoxy bead cures, it is necessary to move the fiber within the curing epoxy and it is advantageous if the position at which the positioner contacts the fiber is at the same site as the epoxy bead. By the invention, the positioner is attached to the fiber using a wax or similar material so that as the epoxy cures, it does not cure in contact with the positioner. When the epoxy is fully cured, the wax is melted and the positioner withdrawn.

6 Claims, 4 Drawing Figures

LASER-FIBER POSITIONING METHOD

This invention relates to a method and apparatus for positioning a light output device such as a laser diode relative to a light input device such as the end surface of an optical waveguide so as to maximize light launched from the laser diode into the waveguide.

Conventionally in the assembly of laser diode packages, in order to achieve a maximum amount of light coupled into a fiber from a laser, micropositioners are used to manipulate the fiber manually in front of the lasing junction. Light from a remote end of the fiber or fiber pigtail is detected and generates a DC level. The fiber is manipulated in front of the laser in a liquid epoxy or low melting point solder and when the DC level is at a maximum, the epoxy is allowed to cure or the low melting point solder is cooled to solidification.

Alternatively as described in our co-pending application Ser. No. 752,983, filed July 8, 1985, a fiber end facing the laser is vibrated by mechanical means to modulate the coupled light. Positional information contained in the oscillatory component of the output signal can be used to reduce misalignment.

A problem with these arrangements is that some slight movement of the fiber can take place as the epoxy cures, so continuous monitoring and restoration of the fiber position should take place as late as possible during the curing procedure. In the co-pending patent application described previously, the technique used for holding the fiber during epoxy curing is a fork arrangement which contacts the fiber at a point which is spaced away from the position of the epoxy bead. This is necessary to ensure that the epoxy does not cure in contact with the fork arrangement since otherwise, the positioner cannot be withdrawn after curing is complete. However, when a restoring force is applied to the fork arrangement to counteract a shifting tendency of the thickening epoxy, it can lead to a bending of that portion of the fiber between the epoxy bead and the fork arrangement. To enable pure translation of the fiber back through the curing epoxy and so minimize the chance of bending, the fiber should be held, and the restoring force applied, at a point on the fiber which is centered on the epoxy bead. However this means that the fiber holding point becomes entrapped in the cured epoxy.

According to the invention there is provided a method of anchoring a fiber to a substrate comprising:

attaching a positioner to the fiber using a meltable material so that the positioner is coated by said meltable material and thereby is separated from the fiber by said meltable material;

moving the positioner to position the fiber in a desired position on the substrate so that a part of the fiber and only the coated portion of the positioner is in contact with a bead of curable material;

continuously monitoring the position of the fiber and maintaining the fiber in said desired position as the curable material cures; and when the curable material is cured, melting said meltable material and withdrawing the positioner.

The meltable material is preferably a wax or low melting point plastic, the wax contacting the fiber over only a small surface area thereof. The meltable material can be melted by heat thermally conducted from the positioner.

Particularly for use in the method, the positioner preferably comprises an elongate probe having a resistive heater adjacent its end. The positioner can have a pointed bead of cured silver epoxy, the meltable material during use being applied to said pointed bead.

An embodiment of the invention will now be described by way of example with reference to the accompanying drawings in which.

Figure 1:
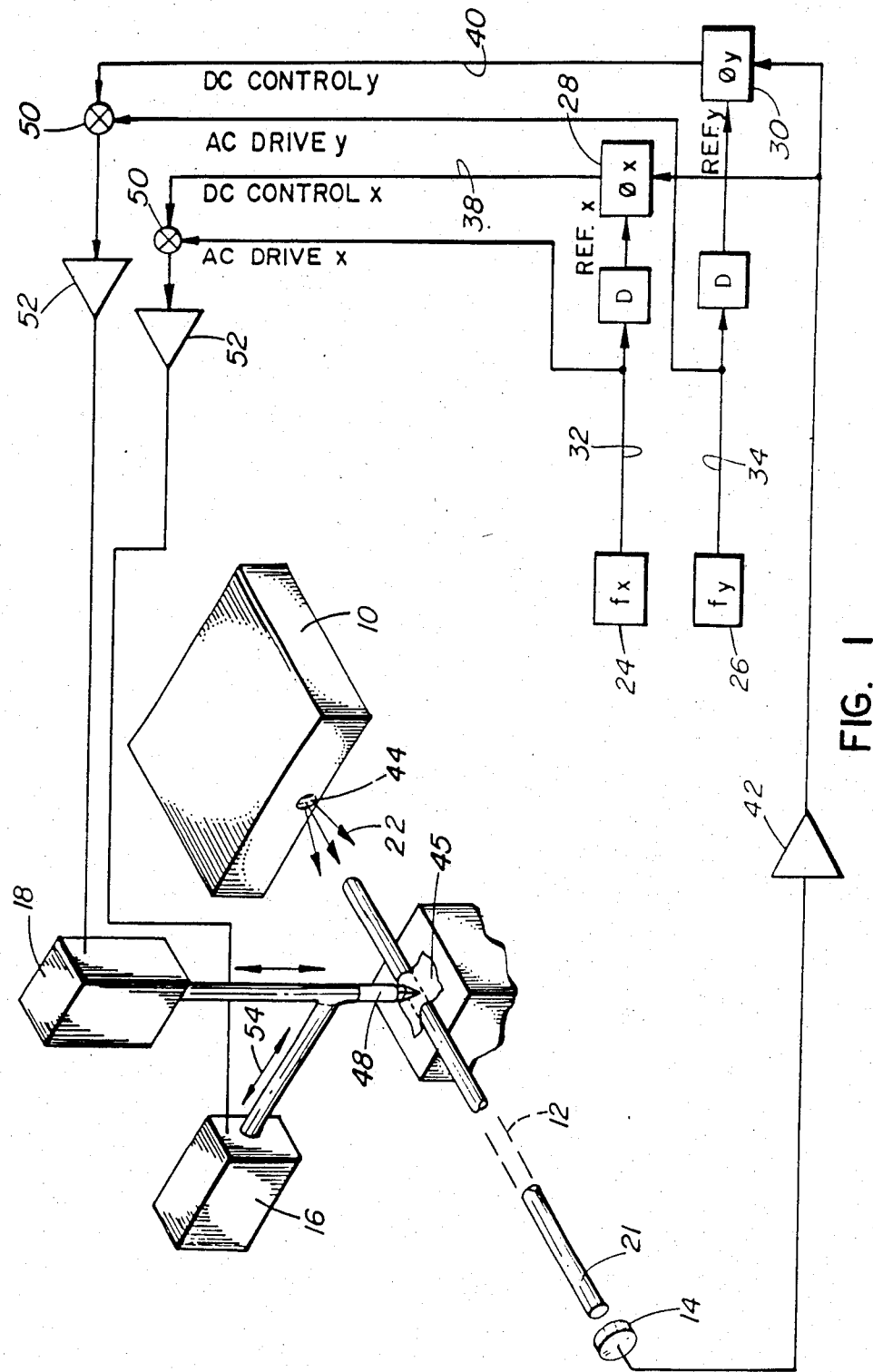
FIG. 1 shows partly in perspective and partly in circuit schematic form, apparatus used in a method according to the invention.

Referring in detail to FIG. 1, there is shown a laser diode 10, a pigtail fiber 12, and an optical detector 14. A piezoelectric crystal 16, drives the fiber end 20 in the x-direction in response to an oscillatory signal at frequency $f_x$ from a generator 24 summed with a DC level 38 from a phase sensitive detector 28. Similarly a piezoelectric crystal 18 drives the fiber end in the y-direction in response to an oscillatory signal at a frequency $f_y$ from a generator 26 summed with a DC level 40 from a phase sensitive detector 30. The DC levels are derived by detecting variation in coupled light resulting from the impressed modulation at $f_x$ and $f_y$ and are maintained at levels which maximize the coupled light.

Figure 2:
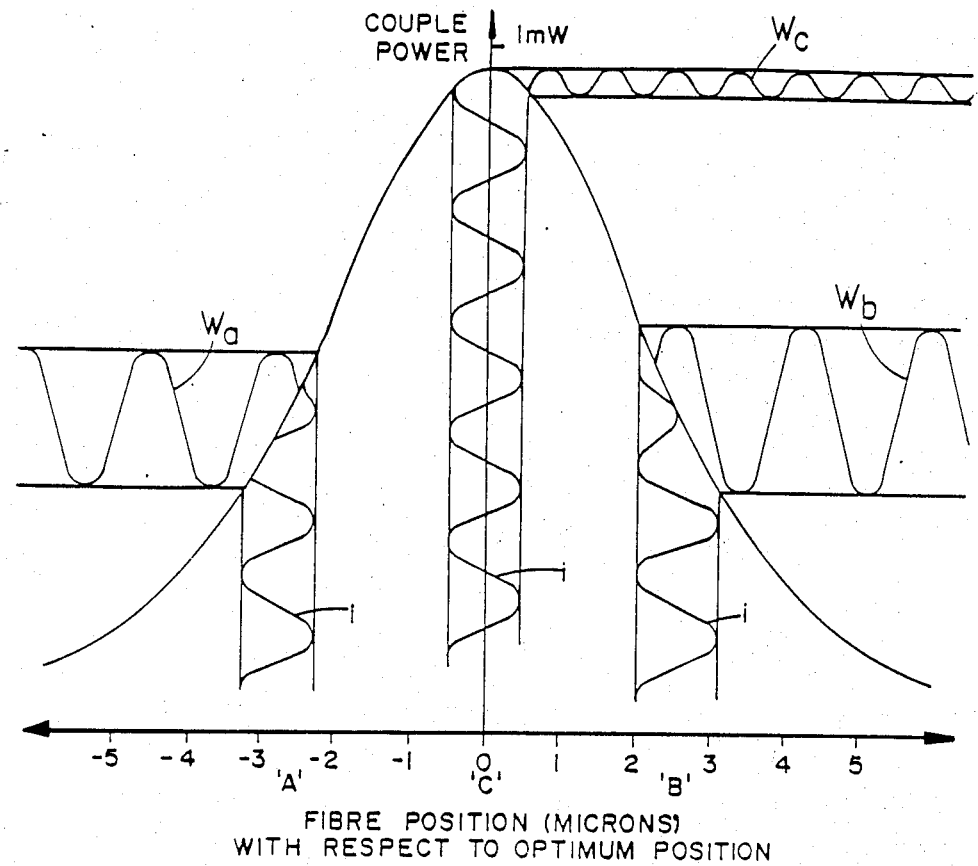
FIG. 2 shows in graphical form the variation in coupling efficiency between a laser diode and an optical waveguide resulting when the input end of the waveguide is vibrated.

The invention finds particular application in the assembly of a laser diode package. In the package, the laser diode chip 10 is normally bonded to a heat sink. The pigtail fiber 12 passes through a hermetic seal in the wall of a package housing and an end portion 20 of the fiber rests over a pedestal, the height of which is marginally lower than the height of the lasing junction within the laser chip 10. An important step in the assembly of a laser diode package is the accurate positioning of the pigtail fiber end 20 to maximize light launched from the laser chip 10. Typically at a distance of several tens of microns from the laser emitting facet, the light coupling profile is as shown in FIG. 2 and spreads over a diameter of 5 to 10 microns, the pigtail fiber itself typically having a core radius of 10 microns. To maximize light coupling from the laser chip 10, the fiber pigtail end portion 20 can be both tapered and rendered bulb ended to provide a lens action. Even so, the most important consideration in maximizing light launched into the fiber 12 is in having the axis of the fiber end portion 20 accurately aligned with laser emitting spot 44.

In a method utilizing the present invention, light coupled from laser 10 into the fiber near end 20 is detected at a remote end 21 by a PIN or avalanche photodiode 14 mounted to receive light from the pigtail fiber. A corresponding detector output is taken through an amplifier 42 to a signal analysing circuit including the phase sensitive detectors 28, 30. The fiber end 20 is moved in a mass of liquid epoxy 45 by energizing piezoelectric crystals 16, 18. Crystals 16 and 18 produce x and y-directional movement, respectively, where the fiber axis extends along the z-direction, the x and y movement being combined at an elongate probe 48. Although details of the piezoelectric crystal mounting arrangement are not shown, it will be understood that through the independent action of the crystals the probe 48 can be moved to any spot within a predetermined zone of the xy plane.

Drive to the piezoelectric crystals 16, 18 is applied from drive generators 24, 26 which generate oscillatory signals at respective frequencies $f_x$ and $f_y$. The frequencies selected are not harmonically related. For effective operation of the phase sensitive detectors, $f_x$ and $f_y$ are greater than 10 Hz and are separated by at least 10 Hz to allow easy discrimination. A first output signal from each drive generator is taken through a summing junction 50 to a drive amplifier 52 and then applied to its corresponding piezoelectric crystal.

Second outputs from the drive generators 24, 26 are applied as reference signals to respective phase sensitive detectors 28, 30. The reference signals permit the phase relationship between the applied vibration and the detected signal to be determined. Delay D is introduced to compensate for the round trip time of the ac drive producing vibration and the detected signals returning to the detectors 28, 30. If the signals are in phase, then the fiber end 21 must be moved in one direction to increase coupling whereas if the signals are out of phase then the fiber end must be moved in the opposite direction.

Figure 3:
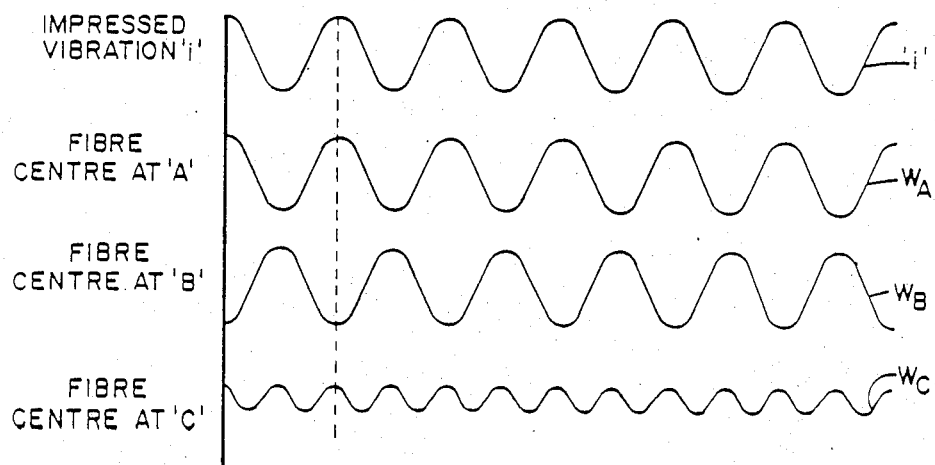
FIG. 3 shows the vibration and oscillatory component of detected light applied to a common time base.

The light coupling efficiency between the laser output facet and fiber as a function of misalignment in the x-direction is typically as shown in FIG. 2. Ideally the fiber is positioned at a point C corresponding to the fiber and laser being accurately aligned at the x-direction. In fact, after initial positioning of the fiber end relative to the laser, the fiber is typically at a position 'A' or 'B' on one side or other of the optimal position 'C'. When the signal at frequency $f_x$ is applied to the piezoelectric crystal 16, the fiber end is oscillated as represented by arrow 54 (FIG. 1) and waveform 'i'. At the detector 14, a corresponding electrical signal is generated having in addition to a DC component, an oscillatory component Wa, Wb or Wc depending on the median position of the fiber. For accurate alignment, the fiber should be in a position in which the amplitude of the oscillatory component is minimized as shown by waveform Wc. The waveforms are shown with a common time base in FIG. 3 which also shows their phase relationship. The phase sensitive detector 28 is tuned to frequency $f_x$ and, dependent on the amplitude and phase difference between the input signal from the drive generator 24 and that from the detector 14, a DC control signal is generated which is summed with the AC drive from drive generator 24 at the summing junction 50. The control signal is used to effect x-direction translational movement of the active surface of piezoelectric crystal 16 and thereby the pigtail fiber end 20. As shown in FIG. 3, it is evident from the amplitude of waveforms Wa and Wb that movement of the fiber is required to provide effective alignment. Moreover it is clear from the phase relationship of Wa and Wb relative to waveform 'i' in which direction the fiber should be moved to effect alignment.

A corresponding adjustment is effected in the y-direction by vibrating the fiber end 20 at a different frequency $f_y$ and analysing the $f_y$ oscillatory component of the detected signal to derive its amplitude and phase relationship to the impressed modulation.

As previously indicated, this method finds particular application in fixing a fiber relative to a laser chip. In a particular implementation of that method, the fiber end portion 20 is held in the bead 45 of epoxy resin with the fiber end surface itself clear of the epoxy bead to permit light to be coupled directly into the fiber. The epoxy is cured once the x and y control loops have been energized to fix the fiber end portion in its most effective position. It has been found that as epoxy resin is cured, the fiber end portion 20 can be moved of the order of 1 micron merely as a result of the curing mechanism. With the dynamic method described, if there is some movement of the fiber during curing, a restorative force is applied during the initial curing stage.

Figure 4:
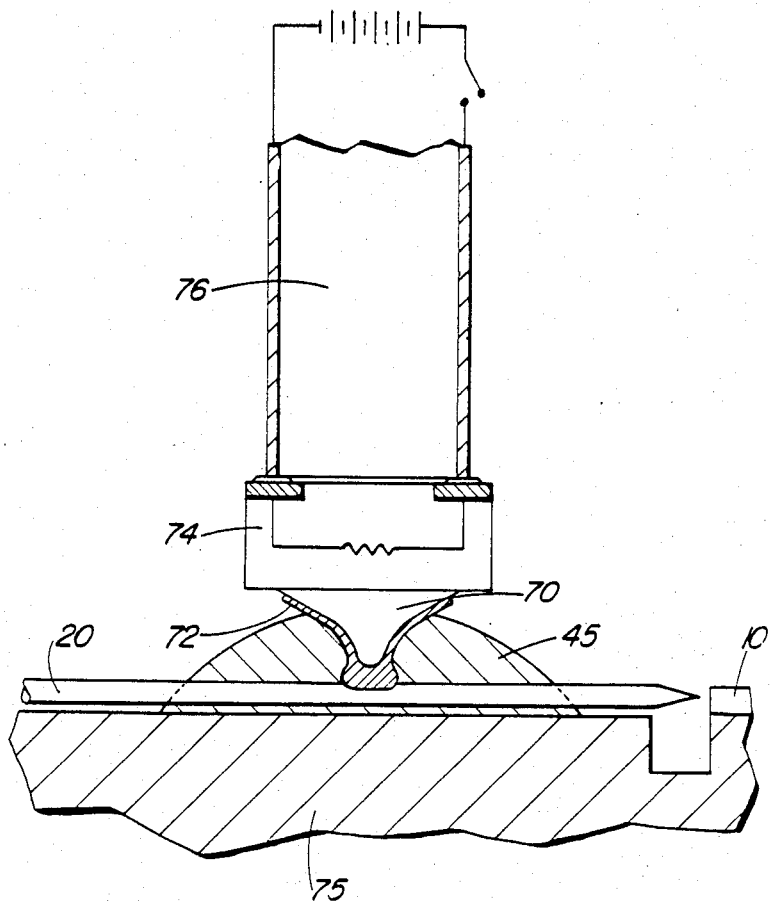
FIG. 4 is a sectional view showing interengagement between a fiber and a fiber end positioner used in the method.

To ensure that translational movement of the fiber through the epoxy rather than fiber bending takes place, the fiber is held, and the restoring force applied, at a point on the fiber which is centered in the epoxy bead 45 as shown in FIG. 4.

A holding tip 70 forming part of probe 48 is attached to the fiber by a layer 72 of fusible material such as wax, or low melting point plastic. A compact resistive heater 74 which is used to melt the fusible material 72, is soldered to the end of the elongate probe 48 which comprises a sliver of double-sided printed circuit board along which electrical current to the heater 74 is applied. To disturb the epoxy attachment as little as possible, the holding tip 70 contacts the fiber 20 over a short length (a few fiber diameters or less). The tip is made by forming a cone of silver epoxy paste on the bottom of the resistive heater 74. When the desired tip shape has been achieved, heater current is applied to the chip resistor 74 to heat and thereby cure the silver epoxy. When the silver epoxy has cured, black wax 72 is melted onto the hot tip to thoroughly coat it.

To initially capture the fiber before alignment, the cold heater tip 70 is moved into contact with the fiber 20. Then heater current is applied and the molten wax is allowed to flow into contact with the fiber. The heater current is then removed and when the wax solifies, the top of the fiber is held firmly to the holder tip by the cold wax. The entire fiber and tip assembly is then immersed in the uncured epoxy bead 45 located on a copper block sub mount 75 and the fiber positioned by movement of the holder 48 until optimum coupling is achieved. The epoxy 45 is then UV or air cured around the wax-coated holding tip 70. During at least the early portion of the curing, the real time alignment system is operated to counteract any shifting of the fiber caused by the epoxy. When the epoxy has fully cured, the holder tip is retrieved simply by applying heater current to melt the wax. As long as the wax originally covers enough of the tip to shield it from direct contact with the epoxy as shown in FIG. 4, it can easily be pulled free.

Using this holder/positioner the fiber does not have to be bent to obtain alignment with the laser. This ensures that no stress is frozen in when the epoxy cures and the loss in coupling efficiency caused by slight laser-fiber angular misalignment is avoided. Using the wax fixture, the fiber is held firmly by the positioning apparatus, allowing for a strong restorative force to be applied in all directions perpendicular to the fiber axis. Since the fiber is held at a point actually inside the epoxy, this permits the use of very strong restoring forces without fiber bending.

Although the invention has been described in terms of a pigtail fiber 12 being fixed relative to a laser chip 10, the method can be used to precisely align other fiberoptic input and output devices. Thus the method can be used in aligning fibers for coupling light at a connector or splice site. It will be appreciated that although in this particular embodiment the light input device is vibrated, in an alternative embodiment the light input device can be fixed and the light output device vibrated.

The arrangement described above uses the same piezoelectric device to effect both the applied vibration and the translational movement. It will be understood that different mechanisms may be used for these different tasks. For instance, the vibration can be applied sonically using a loudspeaker, and the piezoelectric devices used only to effect the restoring translational movement of the fiber.

Although in the embodiment described the positioner is fully withdrawn from the anchored fiber when the wax melts, the positioner is alternatively fabricated with a sacrificial tip which is joined to the main positioner body with a meltable material. The tip is immersed directly into the epoxy bead during fiber positioning and is left there after the epoxy cures.

What is claimed is:

1. A method of anchoring a fiber to a substrate comprising:

attaching a positioner to the fiber using a meltable material so that the positioner is separated from the fiber by said meltable material;

moving the positioner to position the fiber in a desired position on the substrate so that the meltable material and a part of the fiber, but not the positioner are in contact with a bead of curable material which in turn is in contact with the substrate;

continuously monitoring the position of the fiber and maintaining the fiber in said desired position as the curable material cures and anchors the fiber to the substrate; and when the curable material is cured, melting said meltable material and withdrawing the positioner.

2. A method of anchoring a fiber to a substrate as defined in claim 1, further including moving the positioner so that the positioner and the meltable material are substantially centered in the curable material as the material cures.

3. A method as claimed in claim 2 in which the meltable material is a wax.

4. A method as claimed in claim 1 or 2 in which the positioner has a pointed tip and the meltable material is coated on an end part of the tip.

5. A method as claimed in claim 4 wherein the positioner houses a resistive heater.

6. A method as claimed in claim 2 in which the position of the fiber during curing of the curable material is monitored by directing light from a laser into an end of the fiber adjacent to the bead of curable material, monitoring the output of light at a remote position of the fiber and moving the position of the fiber within said bead to maximize the level of monitored light.

* * * * *